Figure 1:
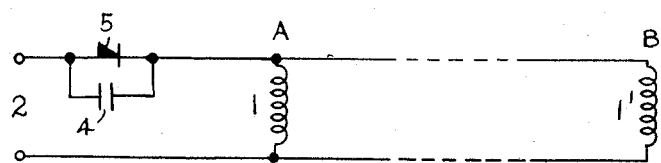

May 6, 1958 SHAFI-UDDIN AHMED CHOUDHURY 2,833,973
OPERATION OF DYNAMO-ELECTRIC MACHINES IN MUTUAL SYNCHRONISM
Filed March 19, 1956

INVENTOR
SHAFI-UDDIN AHMED CHOUDHURY
By
HIS ATTORNEY

United States Patent Office 2,833,973
Patented May 6, 1958

2,833,973

OPERATION OF DYNAMO-ELECTRIC MACHINES IN MUTUAL SYNCHRONISM

Shafi-uddin Ahmed Choudhury, Rugby, England, assignor to The British Thomson-Houston Company Limited, London, England, a British company Application March 19, 1956, Serial No. 572,429

Claims priority, application Great Britain April 7, 1955

7 Claims. (Cl. 318—44)

This invention relates to the operation in mutual synchronism of dynamo-electric machines of the kind having polyphase secondary windings which in operation are interconnected and primary windings which are connected to a common source of supply.

In an arrangement for operating dynamo-electric machines of the above character in synchronism with one another, the problem is generally that in which the rotor of one of the machines, referred to as the transmitter is rotated by any suitable means and the rotor of the or each other machine, acting as a receiver, is required to follow the rotation of the transmitter machine. The receiver machine may also be required to drive a load.

The present invention is concerned with improved means for bringing up to, and maintaining in, synchronism the rotors of machines of the kind set forth by the introduction of a direct current component into the primary windings of the machines whereby to improve the self-synchronising torque of the machines, and to promote their ability to produce synchronising torque when one of the machines is connected to the other, or others, from standstill.

According to the present invention, the D. C. component is introduced into the primary windings of the machines from the common source of single-phase supply by including in series with the supply to the primary windings a half-wave rectifier, a capacitor or other impedance being connected in parallel with it to provide a path for the alternating current. The D. C. component is by this means developed directly from the single-phase A. C. supply.

The invention may be applied to the mutual synchronisation of machines which, while possessing polyphase secondary windings which are inter-connected with one another, have single-phase primary windings connected to the common source of single-phase voltage. In such an arrangement the machine must be continuously synchronised from stand-still, since no torque is present in the receiver to cause it to rotate as a motor in the event of one machine being rotated when the other to be synchronised with it is at standstill. In such an arrangement, the function of the D. C. component is to reduce hunting and instability in the synchronising of the machines when they are running in mutual synchronism.

The invention may also be applied to machines of the kind in which, in addition to having mutually interconnected polyphase secondary windings, are provided with primary windings in which out of phase A. C. voltages are developed when one of the windings is directly connected to a single-phase source of supply by means of a phase-splitting capacitor connecting the terminal of another winding to the source. In this arrangement the D. C. component is introduced into the winding directly connected to the source by reason of the rectifier included in the connection to the supply, a capacitor being connected in parallel with the rectifier to provide a path for the alternating current, the other winding being isolated from the D. C. component by virtue of the phase-splitting capacitor.

The invention is also applicable to machines which, while having polyphase secondary windings which are interconnected with one another, are provided with polyphase primary windings, two phases of which are connected to the single-phase supply, while the third phase is connected to the supply through a phase-splitting capacitor. In this arrangement the D. C. component is developed in the two phases which are connected to the single-phase source, the third phase remaining isolated from the D. C. potential by virtue of the phase-splitting capacitor.

Figure 2:
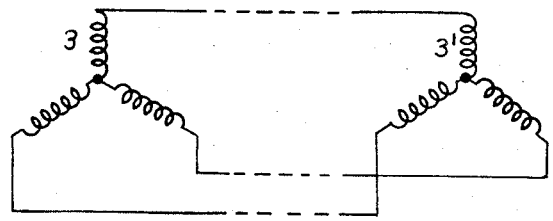
Figure 3:
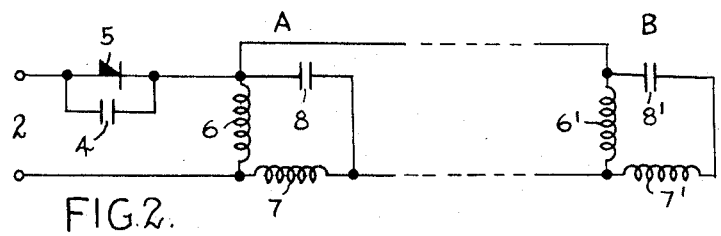

In the accompanying drawings which enable the invention to be more readily understood, Fig. 1 shows the invention as applied to the mutual synchronisation of machines having polyphase secondary, and single-phase primary windings, Fig. 2 shows a machine in which the single-phase primary windings are provided with a phase-splitting capacitor, and Fig. 3 in which polyphase primary windings are employed.

Referring firstly to Fig. 1 of the drawings, we have indicated diagrammatically two dynamo-electric machines A and B, which are to be run in mutual synchronism. The machines have common elements which are referred to by the same reference numerals, the elements in machine B being indicated by a prime. Each machine has the primary windings, represented in the figure by a single phase winding, connected to a single-phase source, indicated by terminals 2. Each machine is also provided with a polyphase secondary winding 3, the secondary windings being mutually interconnected. The single-phase windings are commonly provided on the stator while the polyphase windings are usually on the rotor. The position of these windings may, however, be reversed if desired. Included in one of the connections from the single-phase supply to the primary windings of the machine is a half-wave rectifier 5, shunted by a capacitor 4. Thus, when the primary windings are connected to the supply 2, they are energised by an A. C. component flowing through capacitor 4 and a D. C. component resulting from the provision of rectifier 5.

Machine A may be regarded as a transmitter, and assuming its rotatable element to be rotated, the corresponding rotatable element of the machine B, which may be regarded as the receiver, will follow the movements of the transmitter, any misalignment of the rotors introducing a torque proportional to the misalignment in a direction to re-establish the aligned condition. The torque provided by the D. C. component resulting from the presence of rectifier 5 is separate from, and additional to, the normal alignment torque arising from the circulating currents in the polyphase windings set up when misalignment occurs.

Although the primary windings of machines A and B have been shown as single-phase windings, they may be wound as polyphase windings with two of the phases (when star-connected) short circuited at their ends, the short-circuit and the terminal of the remaining phase winding being connected to the single-phase supply.

Referring now to Fig. 2, in this arrangement the secondary windings of the machines have been omitted since they are similar to those of the machines indicated in Fig. 1, only the primary windings being illustrated. The primary windings of the machines comprise two windings in quadrature, one of the windings 6 being supplied directly with single-phase from the A. C. supply 2, while the other, and quadrature, winding 7, is supplied through a phase-splitting capacitor 8, connecting one terminal of winding 7 with one A. C. supply terminal, the remaining terminal of winding 7 being connected to the other A. C. supply terminal and to a terminal of winding 6. The reactance of the capacitor 4, which is connected in parallel with the rectifier 5 has a value which is comparable with the reactance of the windings of the machines A and B under short-circuit conditions. In the arrangement shown in Fig. 2, the D. C. component is confined to the windings 6, and 6', but the windings 7 and 7' are isolated by the phase-splitting capacitors 8,8'. Should the alignment of one machine with respect to the other be disturbed, the torque will be developed in the receiver in a direction to reestablish the aligned condition.

In the Fig. 3 arrangement, polyphase primary windings are provided on the machines A and B, the machines then being of the normal selsyn type, having polyphase windings both on the stator and the rotor. In this arrangement the single-phase A. C. is supplied to the terminals of two of the polyphase primary windings 9, 10, the third phase winding 11 being supplied through the phase-splitting capacitor 8.

With the arrangements shown in Figs. 2 and 3, assuming the transmitter machine A to be rotating, the receiver machine B will run up from standstill into synchronism with the transmitter machine A and the D. C. component will also provide damping to minimise hunting.

Although the invention has been particularly described in connection with machines having their polyphase windings connected in star, it is equally applicable to machines having the polyphase windings connected in delta.

What I claim is:

1. In a synchronous system, the combination of a plurality of dynamo-electric machines each having relatively rotatable members one of which carries a polyphase secondary winding and the other a single-phase primary winding, a source of single-phase alternating current voltage, means interconnecting the polyphase secondary windings of said machines, means mutually connecting the single phase windings of said machines to said source, rectifier means inserted in the connection to said source whereby to supply a direct current component to said alternating voltage to said primary windings, and impedance means shunting said rectifier means to provide a path for alternating current from said source.

2. The combination claimed in claim 1 in which said impedance means is constituted by a capacitor.

3. In a synchronous system, the combination of a plurality of dynamo-electric machines each having relatively rotatable members, primary windings on one of said relatively rotatable members, of each of said machines a polyphase secondary winding on the others of said members, a source of single phase alternating current voltage, means interconnecting the polyphase secondary windings of said machines, means mutually connecting one part of each of said primary windings on said machines to said source, means connecting any other part of each of said primary windings of said machines individually to said source through phase splitting capacitors, rectifier means inserted in the connection between said source and said one part of each of said primary windings whereby to supply a direct current component to said primary windings, and impedance means shunting said rectifier means to provide a path for alternating current from said source.

4. The combination claimed in claim 3 in which said impedance means is constituted by a capacitor.

5. In a synchronous system, the combination of a plurality of dynamo-electric machines each having relatively rotatable members, polyphase primary windings on one of said relatively rotatable members of each of said machines, polyphase secondary windings on the others of said members, a source of single phase voltage, means interconnecting the polyphase secondary windings of said machine, means mutually connecting two of said polyphase primary windings on each of said machines to said source, means connecting the third of said polyphase primary windings on said machines to one of the terminals of said source through a capacitor, rectifier means included in the connection to said source whereby to introduce into said primary windings a direct current component from said source, and impedance means shunting said rectifier means whereby to permit alternating current from said source to flow in said primary windings.

6. In a synchronous system, the combination claimed in claim 5 in which said impedance means is constituted by a capacitor.

7. In a synchronous system, the combination of a plurality of dynamo-electric machines each having relatively rotatable members, primary energizing means on one of said relatively rotatable members of each of said machines, a polyphase secondary winding on the others of said members, a source of single-phase alternating voltage, means interconnecting the poly-phase secondary windings of said machines, means mutually connecting said primary energizing means to said source, rectifying means inserted into the connection between said source and said primary energizing means whereby to supply a direct current component to said primary energizing means, and an impedance means shunting said rectifier means to provide a path for alternating current from said source to said primary energizing means.

References Cited in the file of this patent
UNITED STATES PATENTS

| 2,582,208 | Sherwin | Jan. 8, 1952 |
| 2,615,149 | Toomin | Oct. 21, 1952 |